United States Patent
Kadynski et al.

(10) Patent No.: US 9,496,815 B2
(45) Date of Patent: Nov. 15, 2016

(54) METHOD FOR OPERATING A LINEAR MOTOR ASSEMBLY AND LINEAR MOTOR ASSEMBLY

(71) Applicant: FESTO AG & CO. KG, Esslingen (DE)

(72) Inventors: Dominic Kadynski, Kirchheim (DE); Jan Reimer, Esslingen (DE); Benjamin Klein, Sussen (DE); Ralf Hartramph, Albershausen (DE)

(73) Assignee: FESTO AG & CO. KG, Esslingen (DE)

( * ) Notice: Subject to any disclaimer, the term of this patent is extended or adjusted under 35 U.S.C. 154(b) by 0 days.

(21) Appl. No.: 14/650,651

(22) PCT Filed: Dec. 14, 2013

(86) PCT No.: PCT/EP2013/003779
§ 371 (c)(1),
(2) Date: Jun. 9, 2015

(87) PCT Pub. No.: WO2014/095017
PCT Pub. Date: Jun. 26, 2014

(65) Prior Publication Data
US 2016/0190966 A1    Jun. 30, 2016

(30) Foreign Application Priority Data
Dec. 22, 2012    (DE) .................. 10 2012 025 323

(51) Int. Cl.
| | |
|---|---|
| *H02P 6/00* | (2016.01) |
| *H02P 25/06* | (2016.01) |
| *H02K 41/03* | (2006.01) |
| *B60L 13/03* | (2006.01) |

(52) U.S. Cl.
CPC ........... *H02P 25/064* (2016.02); *H02K 41/031* (2013.01); *H02P 6/006* (2013.01); *H02P 25/06* (2013.01); *B60L 13/03* (2013.01)

(58) Field of Classification Search
CPC ................................. H02P 6/00; H02P 25/064
USPC ........................................................ 318/135
See application file for complete search history.

(56) References Cited

U.S. PATENT DOCUMENTS

| | | | |
|---|---|---|---|
| 4,965,501 A | 10/1990 | Hashimoto | |
| 7,035,714 B2 * | 4/2006 | Anderson | B65G 13/02 198/358 |

(Continued)

FOREIGN PATENT DOCUMENTS

| | | |
|---|---|---|
| DE | 4305274 | 9/1994 |
| DE | 69018108 | 8/1995 |
| DE | 102008008602 | 12/2008 |

*Primary Examiner* — Kawing Chan
(74) *Attorney, Agent, or Firm* — Hoffmann & Baron, LLP

(57) ABSTRACT

A method for operating a linear motor assembly includes: open-loop controlled introduction of electric energy to a first stator segment provided with solenoids for an open-loop controlled provision of a magnetic field for a permanent magnet arrangement of a conveying means for a generation of drive forces, and closed-loop controlled introduction of electric energy to a second stator segment provided with a measuring device for a detection of a position of a conveying means and with solenoids for a closed-loop controlled provision of a magnetic field acting on the conveying means, wherein a controlling device effects a temporary switch-over of the second stator segment from a closed-loop controlled state to an open-loop controlled state at a transition of the conveying means from the first stator segment to the second stator segment, and/or at a transition of the conveying means from the second stator segment to the first stator segment.

8 Claims, 2 Drawing Sheets

(56) References Cited

U.S. PATENT DOCUMENTS

| | | | |
|---|---|---|---|
| 2008/0234858 A1* | 9/2008 | Dollens | B65G 43/08 700/230 |
| 2010/0185320 A1* | 7/2010 | Nemeth-Csoka | B23Q 5/28 700/230 |

* cited by examiner

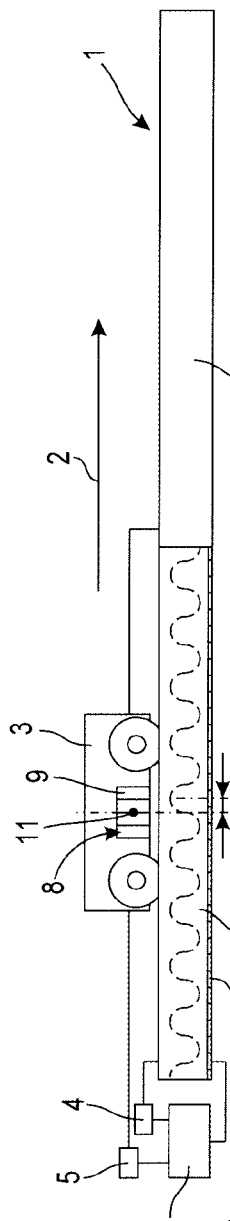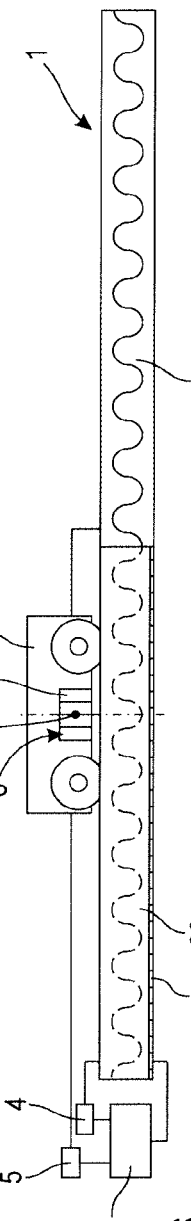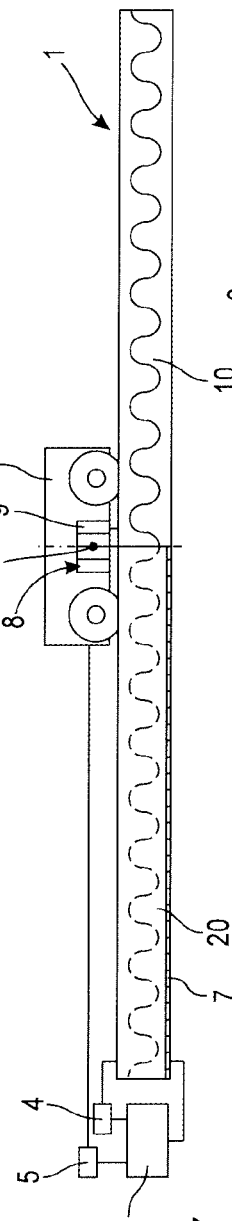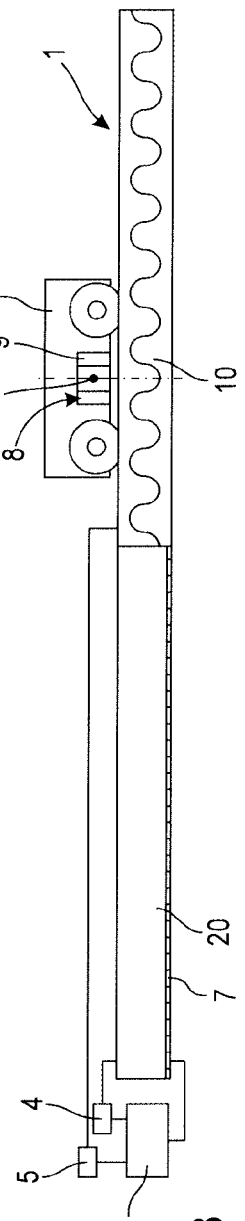
Fig. 5
Fig. 6
Fig. 7
Fig. 8

METHOD FOR OPERATING A LINEAR MOTOR ASSEMBLY AND LINEAR MOTOR ASSEMBLY

This application claims priority based on an International Application filed under the Patent Cooperation Treaty, PCT/EP2013/003779, filed Dec. 14, 2013, which claims priority to DE102012025323.0, filed on Dec. 22, 2012.

BACKGROUND OF THE INVENTION

The invention relates to a method for operating a linear motor assembly. The invention further relates to a linear motor assembly.

According to prior art known to the applicant but not available as a printed publication, a plurality of stator segments, each of which is provided with one or more individually controllable solenoids and which are arranged along a movement path, are controlled by means of a controlling device which is coupled to associated position sensing systems and which provides a closed-loop controlled supply of electric energy to the respective stator segments as a function of a position of the at least one conveying means.

SUMMARY OF THE INVENTION

The invention is based on the problem of providing a method for operating a linear motor assembly and a linear motor assembly which offers a performance similar to that of the linear motor assembly known from prior art while having a simplified structure.

According to a first aspect of the invention, this problem is solved by a method for with the following steps: the open-loop controlled introduction of electric energy to a first stator segment provided with solenoids for an the open-loop controlled provision of a magnetic field for a permanent magnet arrangement of a conveying means for a the generation of drive forces, and the closed-loop controlled introduction of electric energy to a second stator segment provided with a measuring device for a detection of a position of a conveying means and with solenoids for a the closed-loop controlled provision of a magnetic field acting on the conveying means, wherein a controlling device effects a temporary switch-over of the second stator segment from a the closed-loop controlled state to an open-loop controlled state, in particular as a function of the position of the conveying means along a movement path, at a transition of the conveying means from the first stator segment to the second stator segment, and/or at a transition of the conveying means from the second stator segment to the first stator segment.

The first and second stator segments can be lined up along the movement path in any sequence, and one or more conveying means can be moved simultaneously in the stator segments along the movement path under the supervision of the controlling device. By way of example, it may be provided that the second stator segments are provided in those sections of the movement path where a precise knowledge of the position of the respective conveying means and/or a highly efficient use of the magnetic field by the conveying means is/are required. A precise knowledge of the position of the conveying means may, for example, be required if the conveying means conveys a container to be filled with product at a filling station. In this case, there may, for example, be a need for slowing the conveying means to a standstill while precisely maintaining a preset filling position, and/or for a smooth acceleration to a preset target speed following the filling process. A particularly efficient use of the magnetic field emitted by the stator segments by a suitable provision of electric energy is particularly important if an increased resistance to movement is to be expected for the conveying means. In contrast, first stator segments, which only involve an open-loop controlled movement of the conveying means along the movement path, can be provided along those sections of the movement path where a uniform movement of the conveying means without a precise knowledge of the position of the respective conveying means is sufficient, for example. By providing a sectional arrangement for the closed- and open-loop control of the stator segments, the linear motor assembly can be simplified considerably, because there is no need for a position sensing system in the first stator segments. Furthermore, the abandonment of a closed-loop control of all stator segments along the movement path results in a simplification of the controlling device, because fewer position signals of the position sensing systems have to be processed. Furthermore, the looping of conveying means into and/or out of the movement path is easier along first, open-loop controlled stator segments, because there is no need for logging the respective conveying means on and/or off at the associated control algorithm of the controlling device.

By switching the second stator segment from a closed-loop mode to an open-loop mode when the conveying means approaches a transition between a first and a second stator segment, an adaptation of the characteristics of the magnetic fields moving along the movement path and generated by the respective stator segments is made easier. The controlling device can temporarily shut down the currently running control algorithm for the respective stator segment, so that there is no need for complex actions to affect the control algorithm, in particular for matching the frequency and phase angle of the control signal for the second stator segment to the control signal of the first stator segment. As a result, the controlling device can ensure, at a reasonable cost and effort, an at least almost smooth transition of the respective conveying means from a section of the movement path which is basically under closed-loop control and only under open-loop control in certain circumstances to a section of the movement path which is always under open-loop control. Furthermore, the controlling device can ensure an at least almost smooth transition of the respective conveying means from a section of the movement path which is always under open-loop control to a section of the movement path which is basically under closed-loop control and only under open-loop control in certain circumstances.

Advantageous further developments of the invention are the subject matter of the dependent claims.

It is expedient if the controlling device, when introducing electric energy to the second stator segment under closed-loop control, provides an electric AC voltage for the solenoids in such a way that a phase angle of 90 degrees is set along the movement path of the conveying means between an active current component made available to the second stator segment and a position of a magnetic action centre of the permanent magnet arrangement of the conveying means. Such a phase angle results in the maximum magnetic force between the magnetic wave emitted by the solenoids located in the stator segment and supplied with electric energy and the permanent magnet arrangement formed on the conveying means. The magnetic action centre of the permanent magnet arrangement should be considered in analogy to the centre of gravity of a mass and identifies the point where the magnetic fields of the permanent magnet arrangement, which is preferably composed of lined-up bar magnets of opposite polarity, can be combined to form a model of a single magnetic pole. A phase angle of 90 degrees between the active current component and the magnetic action centre is, for example, present if the energy supply of the stator segment is provided by a sinusoidal electric current and the position of the magnetic action centre is phase-shifted along the movement path by a quarter of the resulting wavelength ($\lambda/4$) for the magnetic wave.

In a further development of the method, it is provided that the controlling device provides, when introducing electric energy to the first stator segment under open-loop control, an alternating current with a presettable frequency determined by a target speed of the conveying means to the solenoids and/or regulates a nominal current for the solenoids. In the introduction of electric energy under open-loop control, in which the controlling device is not aware of the actual position of the conveying means owing to the non-existence of the position sensing system, the speed of the conveying means is set as a function of the speed of movement of the magnetic wave, which is generated by exciting the first stator segment with an alternating current. By influencing the frequency of the alternating current, the speed of the conveying means can thus be set. In practical applications, it can be assumed that the magnetic action centre adopts, in the open-loop operation of the stator segment, a phase angle of approximately 90 degrees relative to the active current component set at the stator segment by the application of an electric voltage, thereby being at least substantially in phase with the idle current component. The electric current flowing through the solenoids is preferably controlled in a closed loop for the first stator segment by the controlling device, in order to avoid inhomogeneity in the magnetic waves, which could result in undesirable speed fluctuations for the conveying means.

In an advantageous variant of the invention, the controlling device changes the phase angle between the active current component made available to the second stator segment and the position of the magnetic action centre of the permanent magnet arrangement of the conveying means by 90 degrees when the conveying means approaches a transition between a second and a first stator segment for switching between the closed-loop controlled introduction of electric energy and the open-loop controlled introduction of electric energy into the second stator segment. By this adaptation of the phase angle, a position for the magnetic action centre relative to the magnetic wave provided by the second stator segment, which position at least almost corresponds to the position of the magnetic action centre relative to the magnetic wave adopted after the switch-over to the open-loop control of the second stator segment, is reached even before the switch-over to the open-loop control of the second stator segment. As a result, there is no jump function for the magnetic travelling field and therefore no undesirable jerky acceleration or deceleration of the conveying means when switching between the closed- and the open-loop control for the second stator segment.

The controlling device preferably performs an equal-frequency and in-phase control of the first and second stator segments for a movement of the conveying means across the transition between the second and the first stator segment. In order to ensure the in-phase control of the two stator segments, a distance between the last solenoid of the stator segment preceding along the movement path and the first solenoid of the stator segment following along the movement path has to be included in the calculation of the respective control voltages, in order to ensure that the two magnetic travelling fields of the stator segments overlap at the transition between the stator segments.

It is advantageous if the controlling device, after changing the phase angle by 90 degrees for switching to the open-loop controlled introduction of electric energy into the second stator segment, deactivates a control algorithm for controlling the actual position value of the conveying means and/or an algorithm for a position detection for the conveying means. In this way, it is, for example, ensured that no control deviations which could result in an undesirable, for example jerky, control behaviour at the renewed use of the control algorithm are stored in the control algorithm during the phase of the open-loop control of the second stator segment.

In an advantageous further development of the invention, the controlling device activates, for switching between the open- and the closed-loop controlled introduction of electric energy into the second stator segment, an algorithm for a position detection for the conveying means and reduces, within a presettable period of time which includes at least two control cycles of the controlling device, a difference between a set position value for the conveying means and an actual position value for the conveying means in such a way that the actual position value at least substantially corresponds to the set position value at the end of the period of time. This activation of the algorithm for position detection, which preferably occurs in a first step when switching from open- to closed-loop control, has the purpose of determining an actual position value of the conveying means. The actual position value may, for example, be an actual phase angle between the magnetic action centre and the active current component made available to the second stator segment during its closed-loop controlled operation. Following this, the difference between the actual position value and a presettable set position value, for example a phase angle of 90 degrees, is determined. To avoid a jerky movement of the conveying means when switching to the closed-loop controlled operation of the second stator segment, the settling of the detected difference between the actual and the set position value is distributed between at least two control cycles of the controlling device. When presetting the number of control cycles within which the actual position value is to be matched to the set position value almost completely, factors to be taken into account are, in particular, the mass of the conveying means, the maximum power rating of the solenoids and the flux density of the permanent magnet arrangement as well as the control frequency, in order to avoid undesirable jerky movements of the conveying means in the switch-over process.

It is expedient if, for reducing the difference between the set position value for the conveying means and the actual position value for the conveying means, the controlling device performs, at the start of the switch-over between the open- and the closed-loop controlled introduction of electric energy into the second stator segment, a resetting of at least one integral component of at least one control algorithm for controlling the position and speed of the conveying means to a presettable value, in particular zero, and/or if the controlling device, starting from a reduced current-limiting threshold, raises the current-limiting threshold for the second stator segment across several control cycles. The integral component of the control algorithm sums the control deviations which are detected within the successive control cycles by differentiation between the actual and the set position values and leads, within an adjustment time determined by the properties of the linear motor assembly, to an almost complete match between the actual and the set position value. In addition or as an alternative, jerky movements of the conveying means when switching from the open- to the closed-loop controlled operation of the stator segment can be avoided by initially, in particular at the time of switch-over, reducing a current-limiting threshold for the solenoids in the stator segment, and then raising it again across several control cycles, thereby preventing the build-up of an excessive magnetic potential between the stator segment and the permanent magnet arrangement of the conveying means at the start of the closed-loop control process.

According to a second aspect of the invention, the problem of the invention is solved by a linear motor assembly, comprising a plurality of lined-up stator segments and at least one conveying means movable relative to the stator segments along a movement path, as well as control units assigned to the stator segments and designed for providing electric energy, and a controlling device for providing control signals to the control units, wherein the stator segments are designed for the provision of movable magnetic fields for introducing drive forces into the conveying means, each of which is equipped with a permanent magnet arrangement, and wherein the controlling device is designed for an open-loop controlled provision of electric energy to a first stator segment and for a closed-loop controlled provision of electric energy to at least one second stator segment equipped with a measuring device for a determination of a position of the conveying means, wherein the controlling device effects a temporary switch-over of the closed-loop controlled second stator segment to an open-loop controlled state at a transition of the conveying means from the first stator segment to the second stator segment, and/or at a transition of the conveying means from the second stator segment to the first stator segment. The controlling device can preferably be designed as a programmable logic controller (PLC), the control signals of which are transferred to hard-wired or wireless control units designed for providing electric energy to the stator segments. With a linear motor assembly of this type, one or more conveying means can be moved at different speeds along the movement path determined by the stator segments under open- and closed-loop control.

It is advantageous if a stator segment comprises a plurality of solenoids which are preferably spaced evenly along the movement path, wherein adjacent solenoids are designed such that they provide opposing magnetic fields when controlled collectively by a control unit. By mechanically and electrically combining a plurality of solenoids in a stator segment, both a cost-effective mechanical structure and a simple electric control of the respective stator segments can be obtained.

BRIEF DESCRIPTION OF THE DRAWINGS

An advantageous embodiment of the invention is illustrated in the drawing.

FIGS. 5 to 8 show a transition of a conveying means from a stator segment which is basically operated under closed-loop control and only temporarily under open-loop control to a stator segment operated under open-loop control.

DETAILED DESCRIPTION OF THE PREFERRED EMBODIMENTS

Figure 1:
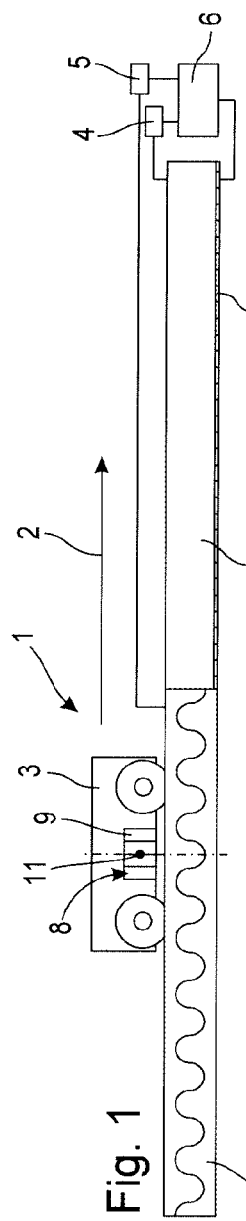
FIGS. 1 to 4 show a transition of a conveying means from a stator segment operated under open-loop control to a stator segment which is basically operated under closed-loop control and only temporarily under open-loop control.
Figure 2:
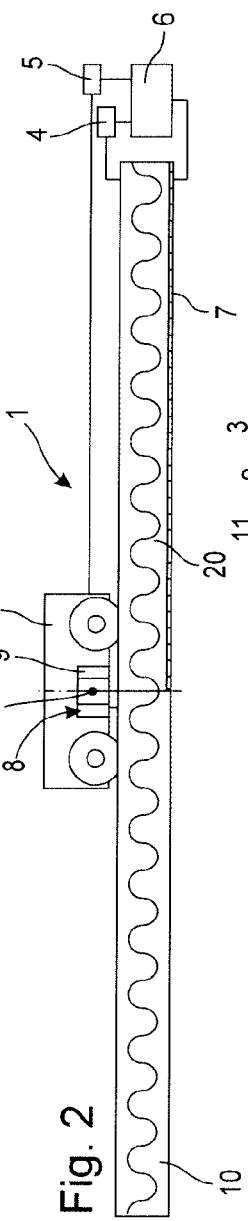
Figure 3:
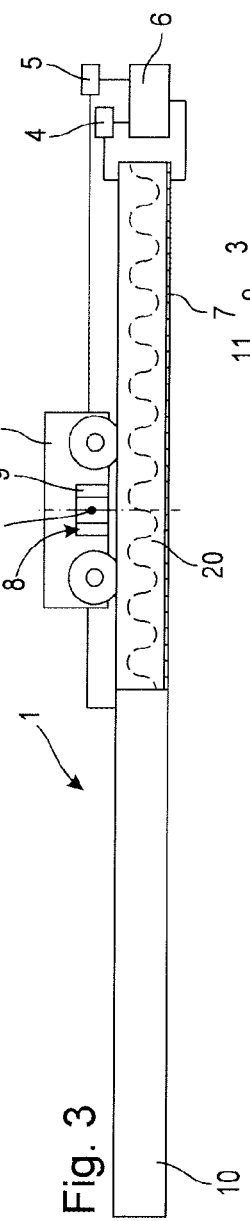
Figure 4:
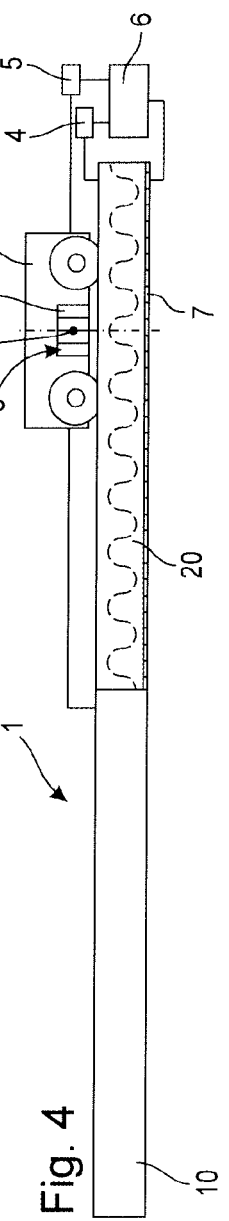

FIG. 1 shows a section of a linear motor assembly 1, which in the illustrated embodiment comprises several stator segments 10, 20 lined up along a movement path 2, at least one conveying means 3 movable along the movement path 2 relative to the stator segments 10, 20, as well as control units 4, 5 assigned to the stator segments 10, 20 for the provision of electric energy and a controlling device 6 for the provision of control signals to the control units 4, 5.

Each of the stator segments 10, 20 comprises several solenoids not shown in the drawing, which are arranged side by side, in particular adjoining one another, along the movement path and which are electrically and mechanically accommodated in the respective stator segments 10, 20. The solenoids are, for example, designed such that turn planes of windings of the solenoids are oriented parallel to a section of the movement path 2 and at right angles to a representation plane of FIGS. 1 to 8. The solenoids are further electrically connected to one another in such a way that all solenoids of a stator segment 10, 20 can be simultaneously supplied with electric energy, in particular with a common electric voltage, and that adjacent solenoids emit mutually opposing magnetic fields. This can, for example, be achieved by opposite electric polarity of adjacent solenoids or by opposite winding of adjacent solenoids. By applying an alternating electric current to the solenoids of the respective stator segments 10, 20, a magnetic travelling field can be generated, which moves in the direction of the movement path 2 and results in the provision of a propulsive force acting on the conveying means 3 by interacting with a permanent magnet arrangement 8 on the conveying means 3. The speed of movement of the conveying means 3 is determined by a frequency of the magnetic travelling field.

In the illustrated embodiment, the permanent magnet arrangement 8 on the conveying means 3 comprises four rectangular bar magnets 9, the largest dimension of which extends normal to the representation plane of FIGS. 1 to 8 and which are lined up along the movement path 2. The bar magnets 9 are arranged such that adjacent bar magnets 9 have opposite polarities. As a result, mutually opposite magnetic field lines emerge from the end faces of the bar magnets 9, which are visible in FIGS. 1 to 8. In the illustrated embodiment, a magnetic action centre 11 is drawn in the geometrical centre of the permanent magnet arrangement 8; this symbolises the point where the magnetic field lines of the bar magnets 9 can be combined to form a model. This magnetic action centre 11 is in particular taken into account in the determination of the phase angle for applying an electric current to the stator segments 10, 20.

The controlling device 6 is designed for providing electric energy to the first stator segment 10 under open-loop control. The first stator segment 10 is preferably supplied with an electric AC voltage, the frequency of which is presettable and can be adapted to different operating conditions of the first stator segment 10. The amplitude of the electric AC voltage, which determines the flow of current through the solenoids of the first stator segment 10, can also be adjusted using a presettable value. In the illustrated embodiment, however, a control of the amplitude of the electric AC voltage is in particular provided by monitoring the current flowing through the solenoids for the first stator segment 10.

The second stator segment 20 differs from the first stator segment 10 by a position sensing system 9, which is electrically connected to the controlling device 6 and which generates a position signal as a function of the position of the conveying means 3 along the movement path 2. In the illustrated embodiment, the position sensing system 9 is designed as a magnetostrictive position sensing system, which is designed for interacting with a permanent magnet mounted on the conveying means 3 but not shown in the drawing, and in which a signal propagation time through the position sensing system 9 is used as a measure for the position of the conveying means 3.

With the aid of the position sensing system 9, the controlling device 6 can control the position of the conveying means 3 along the section of the movement path 2 which extends along the second stator segment 20. In this closed-loop control, the controlling device 6 uses a difference between an actual position value, i.e. an actual position of the conveying means 3 along the movement path 2, and a set position value, i.e. an expected position of the conveying means 3 at a preset point in time, as a control deviation to be minimised over one or more control cycles by means of the control algorithm running in the controlling device 6.

The control algorithm is preferably designed such that the position of the conveying means 3, in particular the position of the magnetic action centre 11 of the conveying means 3, relative to the magnetic travelling wave provided by the second stator segment is chosen such that a phase angle of 90 degrees is always maintained between the active electric current flowing through the solenoids and the magnetic action centre 11 of the conveying means 3. In FIG. 5, which is explained in greater detail below, this is symbolised by providing that a distance between an apex of the electric current for the second stator segment 20, which is represented by a sine wave in the illustrated embodiment, and the magnetic action centre 11 of the conveying means 3 corresponds to a quarter (λ/4) of the wave length (λ) of the magnetic travelling wave. The active current component not shown in the drawing is in phase with the voltage curve at the solenoids, and the idle current component, which is not shown in the drawing, has a phase angle of 90 degrees relative to the voltage and the active current component.

At the transition of the conveying means 3 from the first stator segment 10 operated under open-loop control to the second stator segment 20, which is basically operated under closed-loop control, as shown in FIGS. 1 to 4, the following procedure can be provided. Owing the magnetic travelling wave emitted by the first stator segment 10 as a result of the application of electric energy to the solenoids, the conveying means 3 moves along the movement path 2. If we assume a dwindling resistance to the movement of the conveying means 3, a phase angle between the electric voltage made available to the first stator segment by the control unit 4, which is represented by a sine wave in the illustrated example, and the magnetic action centre 11 of the conveying means 3 amounts to only a few degrees or ideally to 0 percent of the wave length (λ) of the magnetic travelling wave, as shown in FIG. 1. FIG. 1 further shows that the second stator segment 20 does not have to be supplied with an electric voltage if the conveying means 3 is sufficiently distant from a transition between the first and the second stator segment 10, 20.

As the conveying means 3 approaches the transition between the first and the second stator segment 10, 20, the second stator segment 20 is initially activated by the controlling device 6 in an open-loop mode. In this, the controlling device 6 initially controls the second stator segment 20 with the aid of the control unit 5 with an electric voltage in such a way that an equal-frequency, in-phase and equal-amplitude current is obtained. This is to ensure that the magnetic travelling waves of the two stator segments 10, 20 are congruent. As a result, the conveying means 3 can make a smooth transition between the first and the second stator segment 10, 20.

However, as the second stator segment 20 is basically designed for closed-loop controlled operation and this mode is required for many movements, for example for approaching a defined position along the movement path 2 and/or for maintaining a presettable speed of movement, a switch-over of the second stator segment 20 from open- to closed-loop controlled operation is provided. For this purpose, the position sensing system 7 is activated by the controlling device 6 in a first step. By means of a position signal made available by the position sensing system 7, the position of the conveying means 3, in particular the position of the magnetic action centre 11, along the second stator segment 20 can then be determined by means of an algorithm running in the controlling device 6. Next, a control algorithm running in the controlling device 6 is activated; this determines a control deviation from the difference between the actual position value for the conveying means 3 and the set position value for the conveying means 3. This control deviation is then minimised by the controlling device 6 by suitably influencing the frequency and amplitude of the electric AC current to be provided to the solenoids of the second stator segment 20 within a presettable period of time, for example within several control cycles. As a result of the minimisation of the control deviation, the state described above is targeted, in which a phase angle of 90 degrees is maintained between the active current component through the solenoids of the second stator segment 20 and the magnetic action centre 11 of the permanent magnet arrangement 8.

In order to avoid jerky movements of the conveying means 3, it can be provided by way of example that an integral component in the control algorithm is set to a presettable value, in particular to zero, at the time of the switch-over between the open- and the closed-loop controlled operation of the second stator segment 20. In this way, the control algorithm will require several control cycles for matching the actual position value to the set position value, so that a sudden change of the movement state of the conveying means 3 is avoided.

In addition or as an alternative, it can be provided that the amplitude of the electric current provided to the solenoids of the second stator segment 20 is limited to a presettable first value at the switch-over from the open- to the closed-loop controlled operation of the second stator segment 20 and then increased to a second, higher, value within a presettable number of control cycles. In this way, the active current and thus a magnetic force acting on the conveying means 3 is limited. By this time-dependent increase of the current limit threshold for the solenoids, the magnetic force is increased over a presettable period of time, facilitating a smooth transition for the movement of the conveying means from the open- to the closed-loop controlled state.

In addition or as an alternative, it can further be provided that the control algorithm calculates, at the time of the switch-over from the open- to the closed-loop controlled operation of the second stator segment 20, the acceleration or deceleration required for reaching the targeted set position value and, using a presettable maximum acceleration for the conveying means 3, sets the number of control cycles and/or the increase of the current limit threshold in such a way that the maximum acceleration is not exceeded.

At the transition of the conveying means 3 from the second, closed-loop controlled stator segment 20 to the first, open-loop controlled stator segment 10 as shown in FIGS. 5 to 8, the preset phase angle of 90 degrees between the active current component for the solenoids and the magnetic action centre 11 of the permanent magnet arrangement 8 is initially changed to a phase angle of 180 degrees or 0 degrees, as shown in FIG. 6. As a result, the conveying means 3 is moved at least substantially in phase with the idle current component of the solenoids of the second stator segment 20.

The controlling device 6 then begins the control of the first stator segment 10. In this process, the frequency and/or the phase and/or the amplitude of the electric current applied to the first stator segment 10 is/are in particular chosen such that the two magnetic travelling waves of the adjoining stator segments 10, 20 have equal frequencies and/or phases and/or amplitudes, therefore being congruent. In a subsequent step, the controlling device 6 deactivates the control algorithm and the algorithm for determining the position of the conveying means 3 by means of the position sensing system 9, thereby concluding the switch-over from the closed- to the open-loop controlled operation of the second stator segment 20. As it has been ensured that the travelling waves of the adjoining stator segments 10, 20 are congruent, the conveying means 3 can now manage the transition between the second and first stator segments 20, 10 and move along the stator segment 10 operated under open-loop control without any jerky accelerations.

The invention claimed is:

1. A method for operating a linear motor assembly, comprising the steps of: open-loop controlled introduction of electric energy to a first stator segment provided with solenoids for an open-loop controlled provision of a magnetic field for a permanent magnet arrangement of a conveying means for a generation of drive forces, and closed-loop controlled introduction of electric energy to a second stator segment provided with a measuring device for a detection of a position of the conveying means and with solenoids for a closed-loop controlled provision of a magnetic field acting on the conveying means, wherein a controlling device effects a temporary switch-over of the second stator segment from a closed-loop controlled state to an open-loop controlled state at a transition of the conveying means from the first stator segment to the second stator segment, and/or at a transition of the conveying means from the second stator segment to the first stator segment, and
wherein the controlling device when introducing electric energy to the second stator segment under closed-loop control, provides an electric AC voltage for the solenoids in such a way that a phase angle of 90 degrees is set along a movement path of the conveying means between an active current component made available to the second stator segment and a position of a magnetic action center of the permanent magnet arrangement of the conveying means, and
wherein the controlling device changes the phase angle between the active current component made available to the second stator segment and the position of the magnetic action center of the permanent magnet arrangement of the conveying means by 90 degrees when the conveying means approaches a transition between a second and a first stator segment for switching between the closed-loop controlled introduction of electric energy and the open-loop controlled introduction of electric energy into the second stator segment.

2. The method according to claim 1, wherein the controlling device provides, when introducing electric energy to the first stator segment under open-loop control, an alternating current with a presettable frequency determined by a target speed of the conveying means to the solenoids and/or regulates a nominal current for the solenoids.

3. The method according to claim 2, wherein the controlling device performs an equal-frequency and in-phase control of the first and second stator segments for a movement of the conveying means across the transition between the second and the first stator segment.

4. The method according to claim 2, wherein the controlling device, after changing the phase angle by 90 degrees for switching to the open-loop controlled introduction of electric energy into the second stator segment, deactivates a control algorithm for controlling an actual position value of the conveying means and/or an algorithm for a position detection for the conveying means.

5. The method according to claim 1, wherein the controlling device activates, for switching between the open- and the closed-loop controlled introduction of electric energy into the second stator segment, an algorithm for a position detection for the conveying means and reduces, within a presettable period of time which includes at least two control cycles of the controlling device, a difference between a set position value for the conveying means and an actual position value for the conveying means in such a way that the actual position value at least substantially corresponds to the set position value at the end of the period of time.

6. The method according to claim 5, wherein, for reducing the difference between the set position value for the conveying means and the actual position value for the conveying means, the controlling device performs, at the start of the switch-over between the open- and the closed-loop controlled introduction of electric energy into the second stator segment, a resetting of at least one integral component of at least one control algorithm for controlling the position and speed of the conveying means to a presettable value and/or wherein the controlling device, starting from a reduced current-limiting threshold, raises the current-limiting threshold for the second stator segment across several control cycles.

7. A linear motor assembly, comprising a plurality of line-up stator segments and at least one conveying means movable relative to the stator segments along a movement path, as well as control units assigned to the stator segments and designed for providing electric energy, and a controlling device for providing control signals to the control units, wherein the stator segments are designed for a provision of movable magnetic fields for introducing drive forces into the conveying means, each of which is equipped with a permanent magnet arrangements, and wherein the controlling device is designed for an open-loop controlled provision of electric energy to a first stator segment and for a closed-loop controlled provision of electric energy to at least a second stator segment equipped with a measuring device for a determination of a position of the conveying means, wherein the controlling device effects a temporary switch-over of the closed-loop controlled second stator segment to an open-loop controlled state at a transition of the conveying means from the first stator segment to the second stator segment, and/or at a transition of the conveying means from the second stator segment to the first stator segment, and
wherein the controlling device when introducing electric energy to the second stator segment under closed-loop control, provides an electric AC voltage for the solenoids in such a way that a phase angle of 90 degrees is set along a movement path of the conveying means between an active current component made available to the second stator segment and a position of a magnetic action center of the permanent magnet arrangement of the conveying means, and
wherein the controlling device changes the phase angle between the active current component made available to the second stator segment and the position of the magnetic action center of the permanent magnet arrangement of the conveying means by 90 degrees when the conveying means approaches a transition between a second and a first stator segment for switching between the closed-loop controlled introduction of electric energy and the open-loop controlled introduction of electric energy into the second stator segment.

8. The linear motor assembly according to claim 7, wherein a stator segment comprises a plurality of solenoids which are preferably spaced evenly along the movement path, wherein adjacent solenoids are designed such that they provide opposing magnetic fields when controlled collectively by a control unit.

\* \* \* \* \*

UNITED STATES PATENT AND TRADEMARK OFFICE
CERTIFICATE OF CORRECTION

| | | |
|---|---|---|
| PATENT NO. | : 9,496,815 B2 | Page 1 of 1 |
| APPLICATION NO. | : 14/650651 | |
| DATED | : November 15, 2016 | |
| INVENTOR(S) | : Kadynski et al. | |

It is certified that error appears in the above-identified patent and that said Letters Patent is hereby corrected as shown below:

In the Specification

Column 1, Line 38 now reads "means for a the generation"
Should read -- means for the generation --

Column 1, Line 45-46 now reads "segment from a the closed-loop"
Should read -- segment from the closed-loop --

Signed and Sealed this
Fifth Day of September, 2017

Joseph Matal
*Performing the Functions and Duties of the
Under Secretary of Commerce for Intellectual Property and
Director of the United States Patent and Trademark Office*